United States Patent
Wang (10) Patent No.: US 7,307,959 B2
(45) Date of Patent: Dec. 11, 2007

(54) SYSTEM AND METHOD FOR LOCATING OPTICAL NETWORK ELEMENTS AND CALCULATING SPAN LOSS BASED ON GEOGRAPHIC COORDINATE INFORMATION

(75) Inventor: Jian L. Wang, San Jose, CA (US)

(73) Assignee: Fujitsu Limited, Kawasaki-shi, Kanagawa (JP)

( * ) Notice: Subject to any disclaimer, the term of this patent is extended or adjusted under 35 U.S.C. 154(b) by 970 days.

(21) Appl. No.: 10/121,823

(22) Filed: Apr. 12, 2002

(65) Prior Publication Data

US 2003/0193899 A1 Oct. 16, 2003

(51) Int. Cl.
*H04L 12/26* (2006.01)
(52) U.S. Cl. .................................... 370/252
(58) Field of Classification Search ............... 370/254, 370/255, 471, 907, 252; 455/226.1, 427
See application file for complete search history.

(56) References Cited

U.S. PATENT DOCUMENTS

| | | | | |
|---|---|---|---|---|
| 4,590,569 A | * | 5/1986 | Rogoff et al. ............... | 701/219 |
| 4,939,726 A | * | 7/1990 | Flammer et al. ............ | 370/400 |
| 5,400,338 A | | 3/1995 | Flammer, III .............. | 370/94.1 |
| 5,546,087 A | * | 8/1996 | Martin Neira .............. | 342/120 |
| 5,581,261 A | * | 12/1996 | Hickman et al. ........... | 342/385 |
| 5,610,614 A | | 3/1997 | Talbot et al. ............... | 342/352 |
| 5,748,145 A | | 5/1998 | Talbot et al. ............... | 342/357 |
| 5,835,061 A | | 11/1998 | Stewart ...................... | 342/457 |
| 6,115,580 A | | 9/2000 | Chuprun et al. ............ | 455/1 |
| 6,130,890 A | | 10/2000 | Leinwand et al. .......... | 370/400 |
| 6,131,067 A | | 10/2000 | Girerd et al. ............... | 701/213 |
| 6,137,783 A | | 10/2000 | Sallberg ..................... | 370/316 |
| 6,144,641 A | | 11/2000 | Kaplan et al. .............. | 370/238 |
| 6,201,810 B1 | | 3/2001 | Masuda et al. ............. | 370/237 |
| 6,236,652 B1 | | 5/2001 | Preston et al. ............. | 370/349 |
| 6,240,425 B1 | | 5/2001 | Naughton ................... | 707/104 |
| 6,256,309 B1 | | 7/2001 | Daley et al. ................ | 370/395 |
| 6,266,612 B1 | | 7/2001 | Dussell et al. ............. | 701/207 |

(Continued)

OTHER PUBLICATIONS

Black. SONET and T1, Prentice Hall, 1997. pp. 1, 2 and 293-305.*

(Continued)

*Primary Examiner*—Dmitry Levitan
(74) *Attorney, Agent, or Firm*—Bingham McCutchen LLP (57) ABSTRACT

A system for locating optical network elements and determining span loss in a network is described. The geographical locations of the first and second network elements in the network are determined with respect to an earth-based coordinate system. A network management system program displays iconic representations of the first and second network elements relative to one another with respect to the coordinate system. The distance between the first and second network elements over a network span linking the two network elements is determined. The transmission loss of the span is determined by multiplying the calculated distance by a transmission loss factor associated with the transmission medium coupling the first and second network elements. The component losses associated with each of the first and second network elements is determined using known specifications or direct measurement. The span loss is determined by adding the component losses with the transmission loss of the medium.

23 Claims, 6 Drawing Sheets

U.S. PATENT DOCUMENTS

| | | | |
|---|---|---|---|
| 6,301,244 B1 | 10/2001 | Huang et al. | 370/351 |
| 6,745,028 B1 * | 6/2004 | Hutchinson | 455/427 |
| 6,954,644 B2 * | 10/2005 | Johansson et al. | 455/438 |
| 6,980,566 B2 * | 12/2005 | Melick et al. | 370/471 |

OTHER PUBLICATIONS

*Using The Cisco Transport Controller*, Chapter 3.1-3.15, Cisco Systems, Inc.

\* cited by examiner

| COMPONENT | LOSS |
|---|---|
| TAP LOSS | 0.2 dB |
| CONNECTOR LOSS | 0.25 dB |
| SPLICE LOSS | 0.15 dB |
| LOSS DUE TO MULTIPLEXER | 4.0 dB |
| LOSS DUE TO DE-MULTIPLEXER | 4.0 dB |
| LOSS DUE TO ADD/DROP MULTIPLEXER | 10.0 dB |
| SPAN LOSS DUE TO TRANSMISSION LINE | 0.25 dB/km |

SYSTEM AND METHOD FOR LOCATING OPTICAL NETWORK ELEMENTS AND CALCULATING SPAN LOSS BASED ON GEOGRAPHIC COORDINATE INFORMATION

FIELD OF THE INVENTION

The present invention relates generally to data transmission networks, and more specifically to using geographic location information of optical network elements to determine transmission loss characteristics.

BACKGROUND OF THE INVENTION

Large-scale optical data transmission networks, such as Wide Area Networks (WANs), often consist of a multitude of different network elements or nodes stretched over vast amounts of area. The distance between network elements is often on the scale of tens or hundreds of miles. In the case of very large-scale networks, often referred to as Metropolitan Area Networks (MANs) or "long-haul networks", that spread across entire states or countries, the span distances can be very significant. The size of the network can have a great impact on network performance due to signal degradation associated with the transmission media, as well signal degradation due to the network equipment. For such networks, dedicated network elements such as routers or regenerators are needed to boost or amplify the data signals between the processing nodes.

Large-scale networks are often controlled by network management software programs that allow network operators to design, monitor, and manage the nodes and links that comprise the network. Such programs often feature topographical displays that illustrate the layout of the network elements and links. Depending upon the scale of the network, such displays are often provided against map backgrounds to give the user a sense of node location. However, typical network management systems do not provide an accurate placement of the displayed network element icons in relation to their actual physical location relative to one another, or relative to an absolute coordinate system. Most systems simply display the network element icons in a rough approximation of their position in the network. Although some present network management system programs allow the use of street address information to place network elements in the display, such location information is often imprecise, and even non-existent for network elements located in remote areas. The lack of accurate correlation of the network element icon to the actual geographical location limits the ability of the network management system to provide useful diagnostic and performance measurement information to network designers and operators.

What is needed therefore, is a network management system that can accurately calculate performance parameters, such as network span loss, in large optical networks.

What is further needed is a network management system that accurately displays iconic representations of network elements in a topographical map based on the physical geographic location of the network elements.

SUMMARY OF THE INVENTION

A system for locating network elements and determining transmission loss characteristics in a network is described. The geographical locations of the first and second network elements in the network are determined with respect to an earth-based coordinate system, such as a Global Positioning System. The location of the first network element and the location of the second network element are stored in a location database. The distance between the first and second network elements is then determined using a Great Circle Distance calculation. The transmission loss of the span is determined by multiplying the calculated distance by a transmission loss factor associated with the medium coupling the first and second network elements. The component loss associated with each of the first and second network elements is determined by summing together signal attenuation figures for transmission circuitry within each of the network elements. The total transmission loss, or span loss, is determined by adding the component loss due to the first and second network elements with the transmission loss of the medium.

The location information for each network element can be utilized by a network management system program that is configured to display iconic representations of the first and second network elements on a graphical interface relative to one another with respect to the coordinate system.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

A system for determining network performance parameters based on geographic location information of network nodes is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Figure 1:
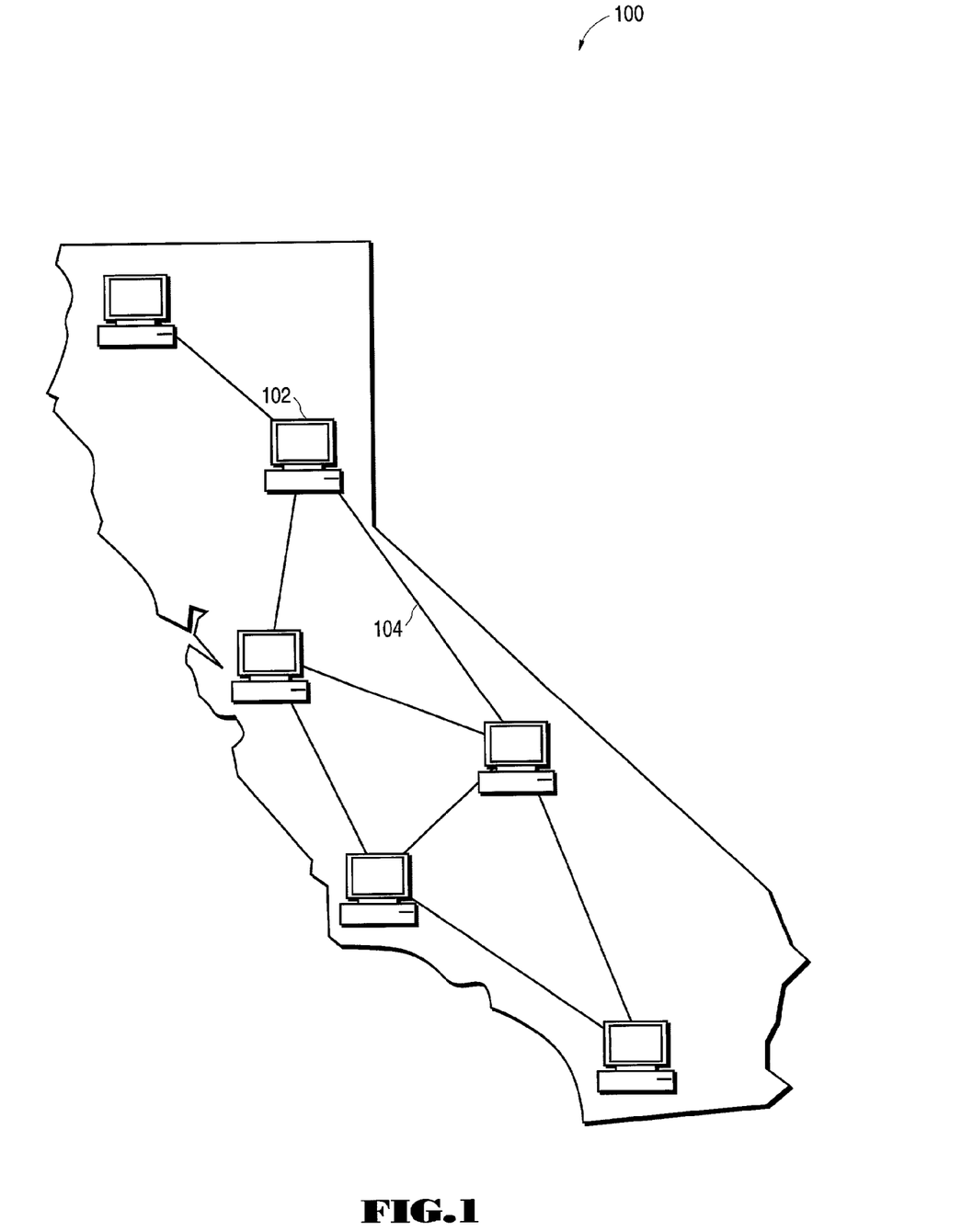
FIG. 1 illustrates a network management display of network elements against a map background according to one embodiment of the present invention.

FIG. 1 illustrates the display screen for a network management system program that implements embodiments of the present invention. As shown in the display screen of FIG. 1, the network elements and links for a long-haul network stretched across California is displayed against a background map of California. Network 100 consists of several network elements or nodes 102 coupled to one another in a series of links or spans 104. Although the exemplary network 100 is a large-scale network, it should be noted that embodiments of the present invention can be used for any type or scale of Wide Area Network (WAN), or similar network in which the distances between the network elements is not insignificant.

The network management system is typically a suite of software programs that is configured to manage the configuration and functional operation of the various elements and links within a WAN. Such a system can be a proprietary software system designed and implemented for a particular WAN, or it may be a commercially available system program that is adapted for use with the location determination functions described herein.

In one embodiment, network 100 is a Synchronous Optical Network (SONET) system in which the media connecting the network nodes is fiber optic cable. It should be noted that for purposes of the present description, the terms "location", "position", "geographic location", "coordinate location", and the like are used interchangeably to refer to the physical location of a network element in three-dimensional space.

Because the distances between the network elements in a large-scale network, such as that illustrated in FIG. 1, can be significant, obtaining accurate location information for each network node is important in managing graphical representations of the nodes, and determining certain performance characteristics of the network. To obtain this information, actual geographic latitude and longitude information for each of the network elements is determined and stored in a database utilized by the network management system programs. In one embodiment of the present invention, the geographic coordinate information is determined using Global Positioning System (GPS) technology. A GPS receiver receives position and elevation information from several GPS satellites that orbit the earth. The receiver uses this information to calculate its position on the earth's surface. In general, commercial GPS receivers are capable of attaining position accuracy down to around 50 meters. In the case of a mobile network element, the GPS module can be programmed to periodically update the location information of the network element, or to update the location information of the network element when the network element is moved from a present location.

In an alternative embodiment, the geographical location information is derived using a LORAN (Long Range Navigation) system. LORAN is often used by ships or aircraft to confirm or to determine geographical positions. A LORAN system operates in the 1,700-kHz range, and measures the time-of-arrival difference between two signals transmitted from two geographically separated ground stations in order to determine the location of the receiver. Besides GPS and LORAN, other location determination systems can also be used in conjunction with embodiments of the present invention. One such alternative system is the Global Navigation Satellite System (GLONASS), which is a GPS-type system primarily utilized by Russian Federation countries. Other alternatives include Global Paging Systems or similar cellular-based location determining systems.

In certain applications, the coordinate locations of the network elements may be pre-determined, rather than derived locally. In these cases in which the precise location of a network element is known, this information can be manually entered by the user into the appropriate location information database.

Figure 2:
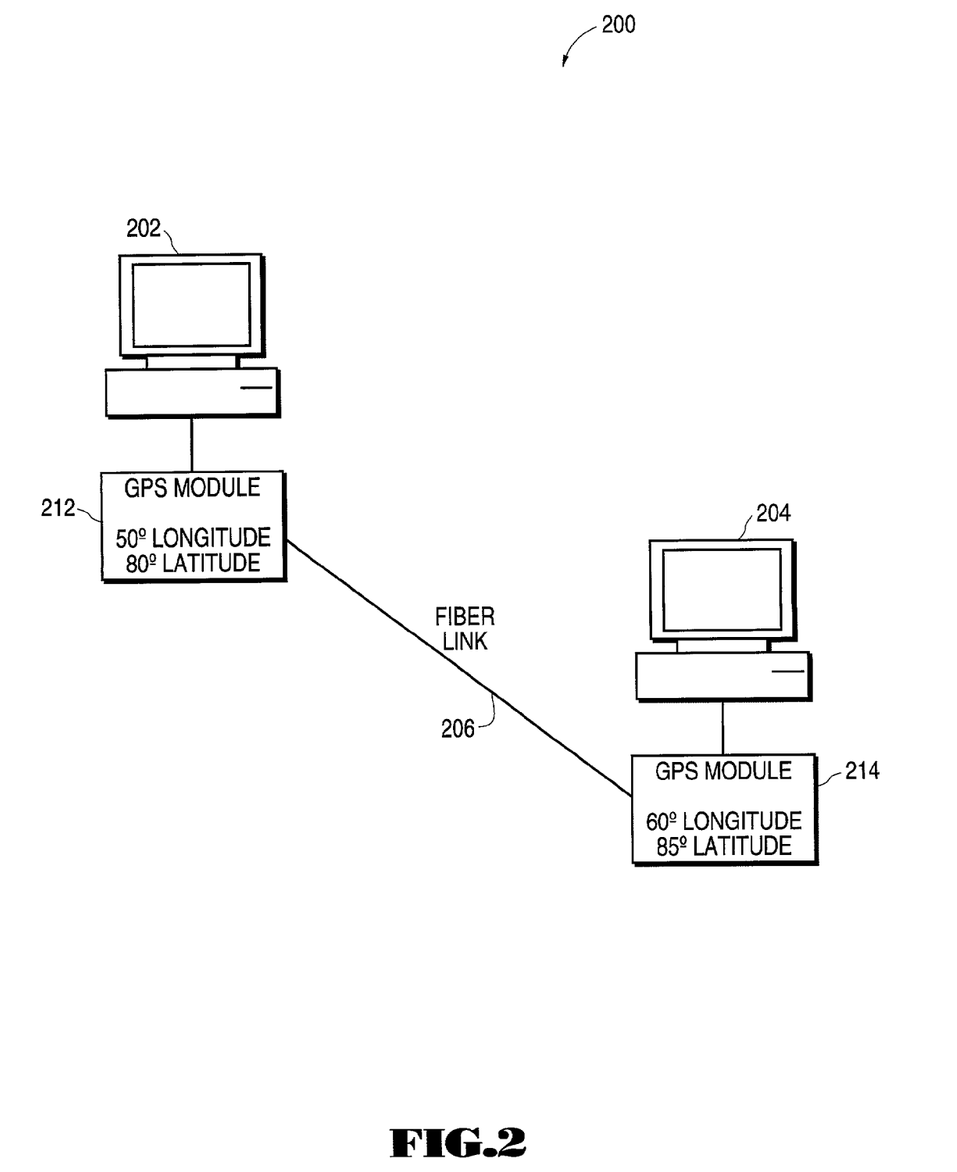
FIG. 2 illustrates the coordinate location information for a pair of coupled network elements.

To determine and provide its own location information, each network element 102 either incorporates or is coupled to a GPS, or similar location determining circuit or device. FIG. 2 illustrates two network elements 202 and 204 that are coupled to one another over a fiber optic link 206. Network element 202 is closely coupled to GPS module 212, and network element 204 is closely coupled to GPS module 214. The GPS modules provide accurate geographic location information for their respective network elements. For the example illustrated in FIG. 2, network element 202 is located at position 50 degrees longitude/80 degrees latitude, and network element 204 is located at position 60 degrees longitude/85 degrees latitude.

The location information for each locatable network element in the array is stored in the network element and provided to the network management system program upon request. For this embodiment, the network element contains a buffer that stores the location coordinates derived by its GPS module. Alternatively, the location information is transmitted directly from the network element to a separate server computer for storage in a database contained in or accessible to the network management system program. The use of actual latitude/longitude derived geographical location information illustrated in FIG. 2, offers a much higher resolution than systems based on cruder location approximation information, such as street addresses.

Once the coordinate location information for the network elements is made available to the network management system program, the various network management programs can utilize this information to optimize their program functionality. For example, the precise location information can be used to accurately place network element icons on a map display for purposes of accurate network topography rendering. Thus, as shown in FIG. 1, the location of the network element icons can correspond to their actual physical location, rather than a rough approximation of their relative positions. This can help network designers and operators in optimizing node placement, route selection, and other network management functions. This precise location information can also aid service personnel in locating network equipment in the field using information provided by the network management system.

For this embodiment, the network management system program can be configured to convert the latitude/longitude coordinate information provided by each network element into corresponding locations on the display screen. An icon representing a network element is placed on the display in a location correlating to the location coordinates of the network element. For display purposes, it is most effective if the network is displayed against a map background for the area of interest, such as that shown in FIG. 1. In this manner, a network manager can obtain a graphical depiction of the physical layout of the network as the network elements are arrayed in the field. If no map background is available, the display will still depict the location of the network elements relative to one another within the deployment area. Of course, the scale of the network and the area displayed in the network management system graphical interface affects the resolution of the network representation and node placement, however relative node locations are readily displayed regardless of the size of the network depiction.

In one embodiment of the present invention, the coordinate location information determined for each network element, as illustrated in FIG. 2, is used to determine certain performance parameters associated with the network links. One important parameter in the performance of large-scale networks is the span loss associated with the network links 206. Fiber optic networks, such as SONET networks, typically employ laser light transmitted over fiber optic media to deliver the network signals. Such laser sources are specified at a certain power transmission rating, typically in units of dBm. This power rating must be sufficient to transmit the light signal to the downstream network receivers. Various factors can degrade the signal from the transmitter to the receiver. One factor is background noise that is inherent in the transmission line and network components; another factor is the span loss associated with the transmission medium; and a third significant factor is power loss associated with the network equipment itself.

Figure 3:
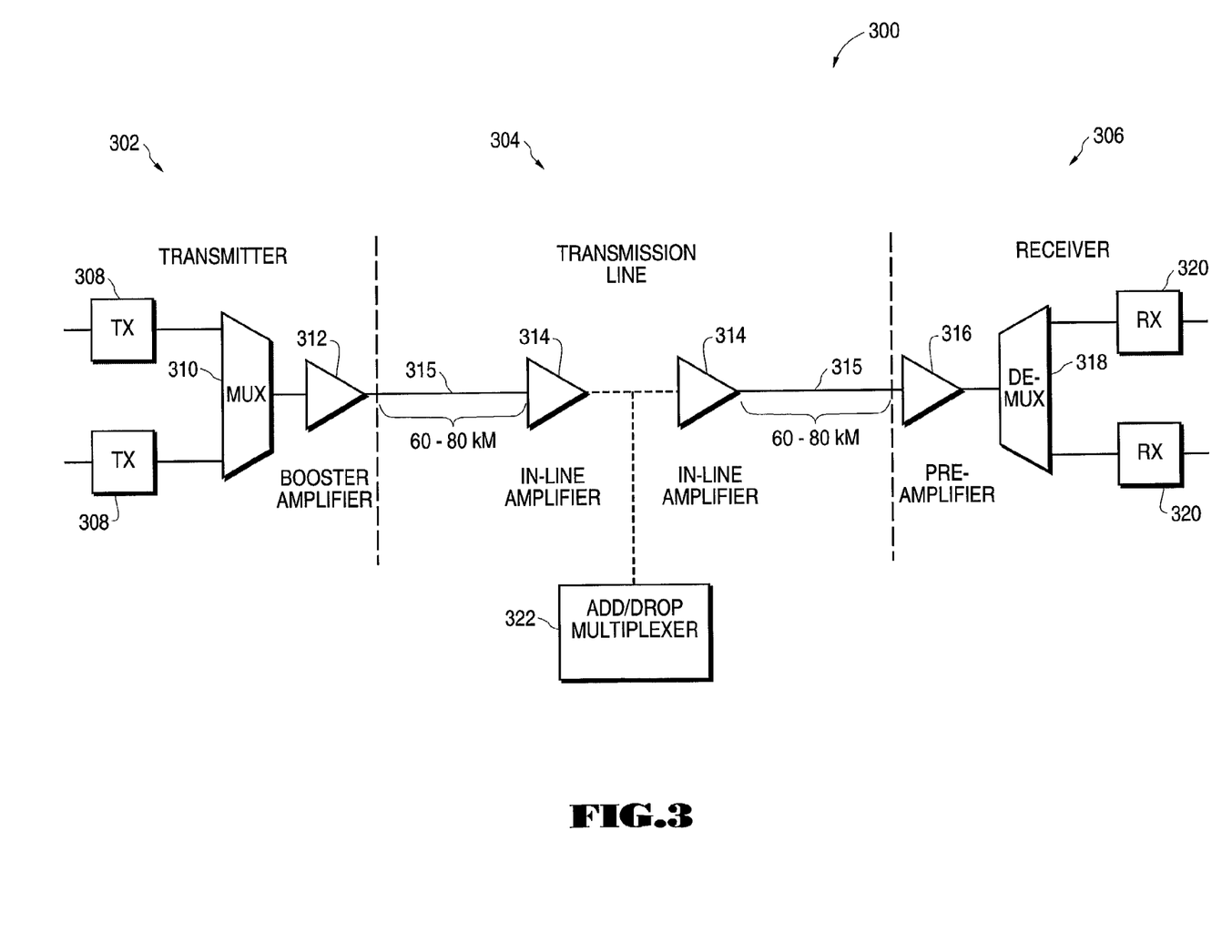
FIG. 3 is a block diagram of the general circuits associated with network elements in the transmission of signals in a typical fiber optic network.

FIG. 3 is a generalized block diagram illustrating some of the circuit blocks associated with network elements in the transmission of signals in an optical based network. The transmitter 302 includes two transmitter channels 308 which are input to multiplexer 310. The signal output from multiplexer 310 is boosted by an internal booster amplifier 312. Depending upon the type of network configuration, the signal can be transmitted over various lengths of fiber optic or wire cable to the next node. For a typical long-haul network, such as one that implements a SONET system, the fiber optic network link 315 can be on the order of 60 to 80 km long. For this distance, additional amplifier or regenerator nodes may be used to boost the signal strength to counteract the effects of span loss across this long distance. Thus, one or more in-line amplifiers 314 may be employed to boost the signal transmitted to receiver 306. Receiver 306 includes a pre-amplifier circuit 316, which boosts the signal level at the input stage of the receiver so that it may be processed within its own circuitry comprising de-multiplexer 318 and receivers 320. Various different types of network elements may also be included in the span between transmitter 302 and receiver 306. For example, in a SONET network, additional circuits, such as an add/drop multiplexer 322 may be present in the network span.

Figure 4:
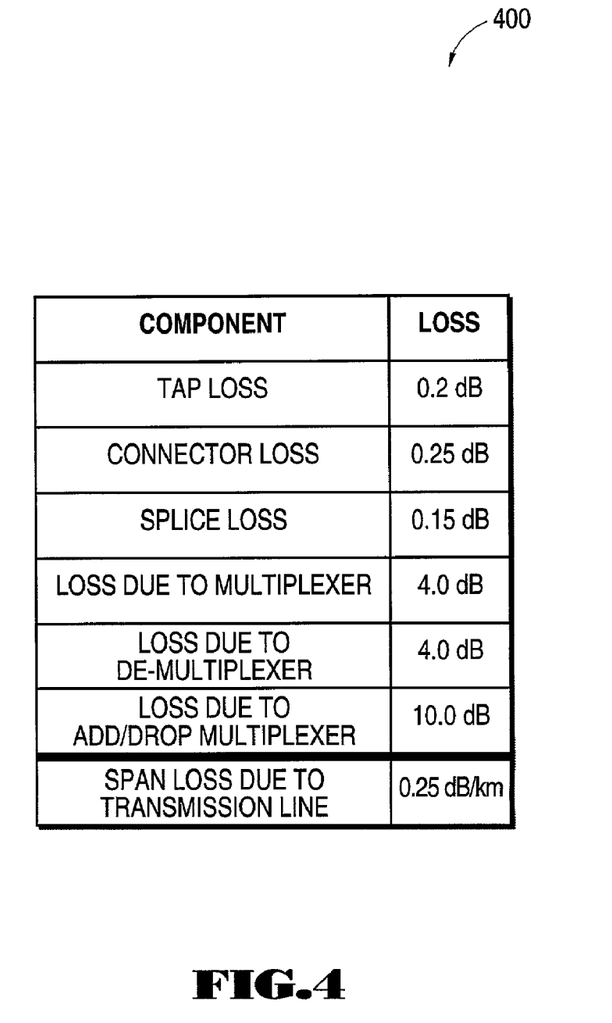
FIG. 4 is a table that lists some exemplary loss factors for typical network components in an optical network.

Each of the circuit elements illustrated in FIG. 3 presents a potential source of power loss between transmitter 302 and receiver 306. Such power loss characteristics are often specified by the network element manufacturers, and are considered by the network designers to ensure proper configuration and transmission characteristics of the network. FIG. 4 is a table that lists some exemplary loss factors for typical network components in an optical based network. Table 400 is not intended to be an exhaustive list of power loss figures, but is instead intended to provide an example of some of the power loss figures for certain components. As shown in FIG. 4, virtually every component of a network node has some loss associated with it. For example, a network element tap that provides an interface for monitoring functions may present a loss of 0.2 dB, a connector may present a loss of 0.25 dB, and a splice may present a loss of 0.15 dB.

Also listed in Table 400 is an illustrative span loss figure provided in units of dB per km of loss for the transmission medium itself. Actual span loss depends on the type and quality of the medium, but a typical span loss figure for fiber optic media is on the order of 0.25 dB/km to 0.40 dB/km. Depending upon the length of the network links, span loss can be a significant attenuating factor in a network link. For example, a typical 100 km fiber optic span will cause a loss of approximately 25 dB, which is greater than the loss associated with a typical fixed add/drop multiplexer (10 dB loss). While power loss figures for components can be fairly accurately determined from specifications provided by the network element manufacturers, determining span loss requires an accurate characterization of the loss characteristics of the media, and more importantly, an accurate determination of the actual span length.

The incorporation of precise geographic location circuitry with the network elements, as shown in FIG. 2, allows the network operator or network management system software to accurately measure the length of the spans between network elements. This, in turn, allows for an accurate measurement of the span loss between pairs of network elements.

In one embodiment of the present invention, the distance between any two network elements on the earth's surface is calculated using the Great Circle Distance formula. A great circle is a circle formed by passing a plane though the exact center of a sphere, and is used in the calculation of distance between two points on a sphere. The formula takes advantage of the fact that the shortest distance between two points on a sphere is the arc on the surface directly above the true straight line, wherein the arc is based on a great circle. This Great Circle Distance formula provides that the distance D between any two points p and a on a sphere, e.g., the earth's surface, is calculated as follows:

$$\cos(D)=\sin(p)*\sin(a)+\cos(p)*\cos(a)*\cos(|dl|)$$

$$\text{distance}=D(\text{in degree})*111.23 \text{ (kilometers/degree)}$$

In the equation above, the variables p and a are the latitudes of P and A, respectively, and |dl| is the absolute value of the difference in longitude between P and A. For this calculation, the latitude and longitude data is required to be in the form of decimal degrees. If the GPS, or other location determination system, provides this data in angular measurements of degrees, minutes, and seconds, these should be converted into their corresponding decimal formats, using known conversion techniques.

An example of calculating distances using the Great Distance formula is provided for the case of one network element located in Austin, Tex., at coordinates 30° 16' 09" N, 97° 44' 37" W, and another in Paris, France, at coordinates 48° 52' N, 02° 20' E. Converting these coordinates to degrees yields the coordinates for Austin equal to 30.27° N, 97.74° W, and the coordinates of Paris equal to 48.87° N, 02.33° E. The distance calculation proceeds as follows:

$$\cos D=[(\sin(48.87)*\sin(30.27)]+[\cos(48.87)*\cos(30.27)*\cos(|-97.74-2.33|)]=281$$

$$D=\cos^{-1}(0.281)=73.68°$$

D=73.680*111.23 km/degree=8,195.44 km, which is the shortest distance between the two network elements across the surface of the earth. These location values are provided for purposes of illustrating the operation of the Great Distance formula only, as it is impractical that a single uninterrupted network link using present technology would span such a distance.

Once the distance between the two network elements is determined, the span loss can be determined by multiplying the calculated distance by the span loss characteristics of the media. Thus, for example, if the calculated span distance is 100 km, the span loss would be 25 dB, for the media illustrated in FIG. 4.

The Great Circle Distance formula illustrated above assumes a straight-line link over the surface of the sphere between the two network elements. In certain cases, the transmission line between the two network nodes may be laid out circuitously, and therefore will not be straight. If the path of the transmission line is known, the extra length can be accounted for and factored into the distance calculation. If the transmission path is not straight and/or its path is unknown, the distance calculation above will yield a best case model of the transmission loss.

The total span loss for the link between the transmitter and receiver is determined by adding the span loss due to the transmission media with the loss due to the components. In general, the component, or equipment loss will be derived by specifications provided by the network equipment manufacturers, or similar data. Alternatively, loss measurements can be performed on the equipment to derive signal attenuation characteristics for the equipment.

Figure 5:
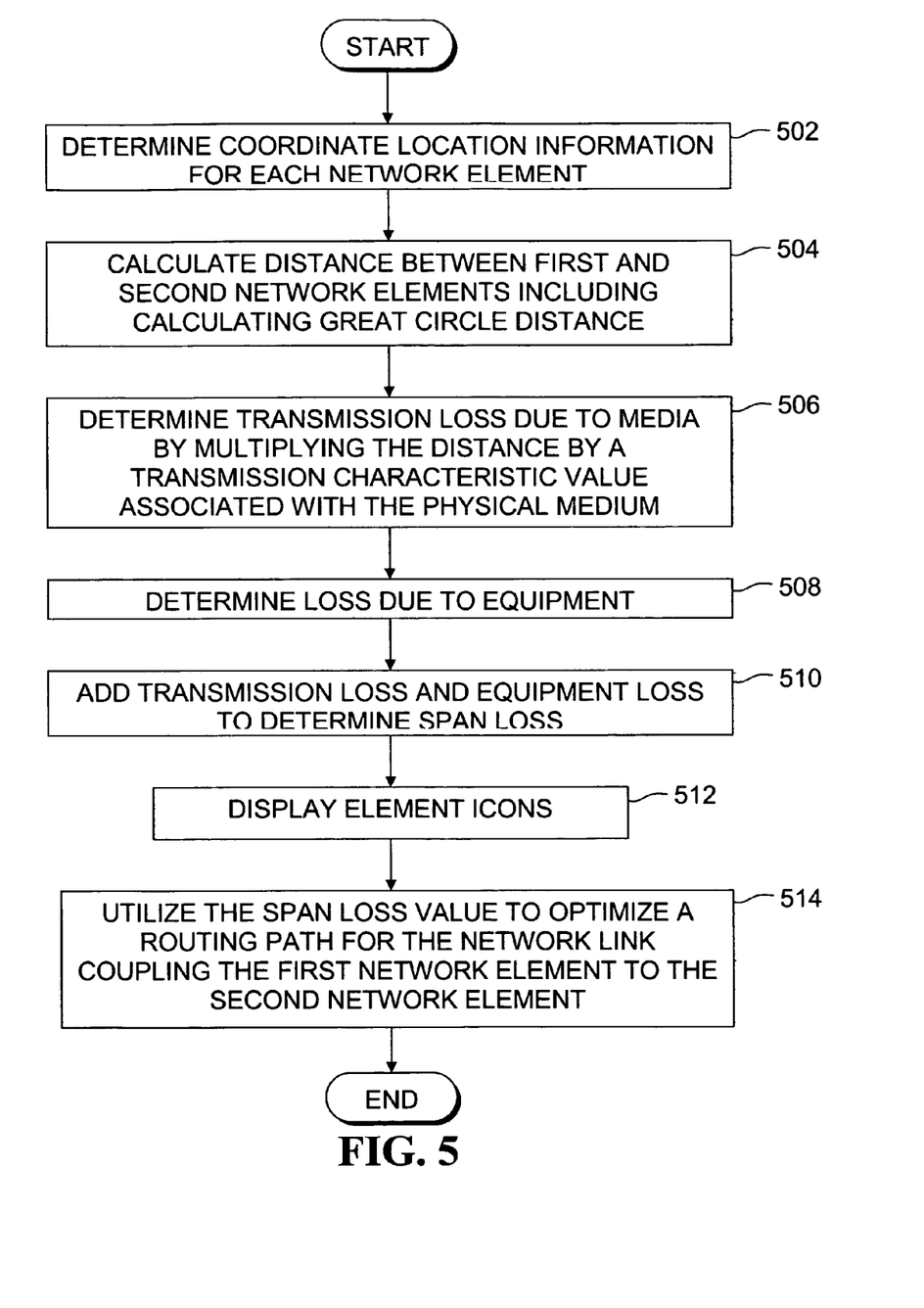
FIG. 5 is a flowchart illustrating the method steps in calculating total span loss or a network span based upon geographic location information of the network nodes, according to one embodiment of the present invention.

FIG. 5 is a flowchart summarizing the steps in calculating total span loss for a network span based upon geographic location information of the network nodes, according to one embodiment of the present invention. FIG. 5 is best understood when viewed in combination with FIG. 6. In step 502, the coordinate location information for each network element is determined. For the embodiment illustrated in FIG. 2, this is accomplished by using GPS location information associated with each network element. The distance between the subject pair of network elements is then calculated using the Great Circle Distance Calculation, step 504, or by a similar distance calculation. If necessary, the location coordinates can be converted between angular measurements into decimal degrees, or vice-versa, using known conversion techniques. The transmission loss due the media 160 is then determined by multiplying the loss characteristics of the media by the calculated distance, step 506. In step 508, the power loss due to the equipment (component loss) is determined. As stated above, this is typically derived from information provided by the network element manufacturers, or by directly measuring the loss characteristics of the network element. The total span loss is then determined by adding the transmission loss with the loss due to equipment, step 510. Element icons corresponding to the locations of network elements are then displayed in relation to a map background, step 512. The span loss value is then utilized to optimize a routing path for the network link coupling the network elements, step 514.

Figure 6:
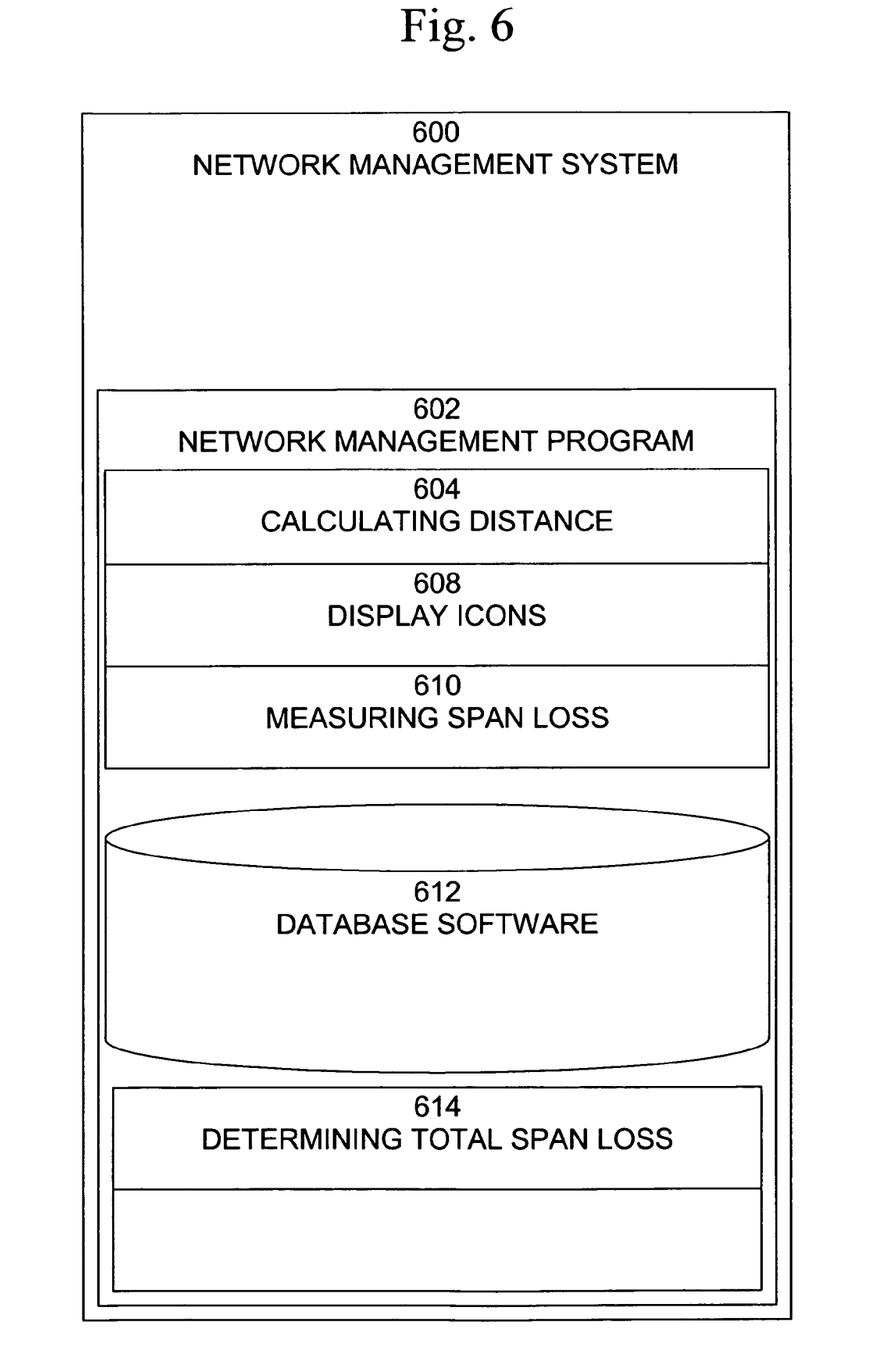
FIG. 6 illustrates a network management system for maintaining and managing a network.

In one embodiment of the present invention, the calculation of total span loss can 614 be performed in a network management system program that manages and maintains a large-scale network from a central server site as shown in FIG. 6. The location information, such as GPS derived latitude/longitude coordinates, from each network element is provided as input into the system 600. The network management system program 602 then performs any necessary coordinate conversions and calculates the distances between pairs of network elements. The component and transmission loss characteristics can be stored in a database accessible to the network management system 600, which then uses this information to determine the total span loss 614.

Although embodiments of the present invention have been described with reference to span loss characteristics of a network link, it should be noted that other performance parameters can also be determined using the accurate location information provided by the use of geographic coordinate location associated with each network node. For example, this information can be utilized by to more accurately determine efficient routes between network elements.

Although the description above illustrates determining network span loss between two nodes 610, it should be noted that the process could be repeated for a sequence of network nodes to determine the span loss across a plurality of such nodes.

Furthermore, embodiments of the present invention can be implemented with any fiber-based networks other than SONET networks, such as SDH (Synchronous Digital Hierarchy) networks.

In the foregoing, a method and system has been described for displaying network elements in a network management program using geographic location information, and for determining network span loss 610 using this location information. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for determining transmission loss through a physical medium coupling a first network element and a second network element based, in part, on the distance between the first network element and the second network element, the method comprising the steps of:
   determining a location of the first network element with respect to an earth-based coordinate system;
   determining a location of the second network element with respect to the earth-based coordinate system;
   transmitting the location of the first network element and of the second network element to a location database;
   storing the location of the first network element and the location of the second network element in a location database;
   calculating a distance between the first and second network elements; and
   multiplying the distance between the first and second network elements by a transmission characteristic associated with the physical medium to obtain a value for the transmission loss between the first and second network elements through the physical medium.

2. The method of claim 1 wherein the location of the first network element comprises a first latitude coordinate and a first longitude coordinate, and the location of the second network element comprises a second latitude coordinate and a second longitude coordinate.

3. The method of claim 2 wherein the step of calculating the distance between the first and second network elements comprises the step of calculating a great circle distance between the first and second latitude and longitude coordinates, respectively, using the following formula:

$$\cos(D)=\sin(p)*\sin(a)+\cos(p)*\cos(a)*\cos(|dl|)$$

wherein distance (km)=D(degree)*111.23 (km/degree), p is the first latitude coordinate, a is the second latitude coordinate, and is the absolute value of first longitude coordinate minus the second longitude coordinate.

4. The method of claim 3 wherein the physical medium coupling the first network element and the second network element comprises a fiber optic cable, and wherein the network link comprises a segment within a Synchronous Optical Network system.

5. The method of claim 2 further comprising the step of determining an equipment loss value for each of the first network element and second network element by summing together signal attenuation values for transmission components in the first and second network elements.

6. The method of claim 5 further comprising the step of adding the equipment loss value for each of the first network element and second network element to the transmission loss value of the medium to obtain a span loss value for a network link coupling the first network element to the second network element.

7. The method of claim 2 further comprising the steps of:
displaying a first element icon against a map background generated by a network management system, the location of the first element icon in relation to the map background corresponding to the location of the first network element with respect to the earth-based coordinate system; and
displaying a second element icon against the map background, the location of the second element icon corresponding to the location of the second network element with respect to the earth-based coordinate system.

8. The method of claim 1 wherein the step of determining the location of the first network element and the location of the second network element is carried out using a Global Positioning System.

9. The method of claim 1 wherein the step of determining the location of the first network element and the location of the second network element is carried out using a LORAN system.

10. A network system coupling a plurality of network elements to form links between connected pairs of network elements, the system comprising:
a first network element incorporating a first geographic location determining circuit;
a second network element incorporating a second geographic location determining circuit; and
a computer-implemented network management system program comprising
a database software storing the first geographic location for the first network element and the second geographic location information for the second network element;
a distance determination process calculating a distance between the first network element and the second network element based on the first geographic location information and the second geographic location information;
a transmission loss calculation process for determining transmission loss through a physical medium coupling the first network element and the second network element based, in part, on the distance between the first network element and the second network element and configured to multiply the distance between the first and second network elements by a transmission loss characteristic associated with the physical medium to obtain a value for the transmission loss between the first and second network elements through the physical medium; and
a display process displaying a first icon representing the first network element on a display based on the first geographic location information, and
displaying a second icon representing the second network element on the display based on the second geographic location information.

11. The system of claim 10 wherein the first geographic location information comprises a first latitude coordinate and a first longitude coordinate, and the location of the second network element comprises a second latitude coordinate and a second longitude coordinate.

12. The system of claim 11 wherein the distance determination process calculates the distance between the first and second network elements by calculating a great circle distance between the first and second network elements using the following formula:

$$\cos(D)=\sin(p)*\sin(a)+\cos(p)*\cos(a)*\cos(|dl|)$$

where distance (km)=D(degree)*111.23 (km/degree), p is the first latitude coordinate, a is the second latitude coordinate, and |dl| is the absolute value of first longitude coordinate minus the second longitude coordinate.

13. The system of claim 12 wherein the transmission medium coupling the first network element and the second network element is a fiber optic cable, and wherein the network system comprises a portion of a Synchronous Optical Network system.

14. The system of claim 11 wherein the location of the first network element and the location of the second network element is provided by a Global Positioning System.

15. The system of claim 11 wherein the location of the first network element and the location of the second network element is provided by a LORAN system.

16. The system of claim 10 wherein the network management system program further comprises:
a component loss calculation process configured to determine signal power loss characteristics associated with the first network element and the second network element.

17. The system of claim 16 wherein the total transmission loss is determined by adding the transmission loss with the component loss.

18. The system of claim 10 wherein the network management system program further comprises
a display process displaying a first icon representing the first network element on a display based on the first geographic location information, and displaying a second icon representing the second network element on the display based on the second geographic location information.

19. An apparatus for determining span loss between a network link coupling a first network element to a second network element, comprising:
means for determining a location of the first network element with respect to an earth-based coordinate system, the location of the first network element comprising a first latitude coordinate and a first longitude coordinate;
means for determining a location of the second network element with respect to the earth-based coordinate system, the location of the second network element comprising a second latitude coordinate and a second longitude coordinate;
means for calculating a distance between the first and second network elements; and
means for multiplying the distance between the first and second network elements by a transmission characteristic value associated with the physical medium to obtain a transmission loss value between the first and second network elements through the physical medium.

20. The apparatus of claim 19 wherein the means for calculating the distance between the first and second network elements comprises means for calculating a great circle distance between the first and second latitude and longitude coordinates, respectively, using the following formula:

$$\cos(D)=\sin(p)*\sin(a)+\cos(p)*\cos(a)*\cos(|dl|)$$

wherein distance (km)=D(degree)*111.23 (km/degree), p is the first latitude coordinate, a is the second latitude coordinate, and |d| is the absolute value of first longitude coordinate minus the second longitude coordinate.

21. The apparatus of claim 20 further comprising:
means for determining an equipment loss value for each of the first network element and second network element by summing together signal attenuation values for transmission components comprising the first and second network elements; and
means for adding the equipment loss value for each of the first network element and second network element to the transmission loss value of the medium to obtain a span loss value for a network link coupling the first network element to the second network element.

22. The apparatus of claim 21 further comprising:
means for displaying a first element icon against a map background generated by a network management system, the location of the first element icon in relation to the map background corresponding to the location of the first network element with respect to the earth-based coordinate system; and
means for displaying a second element icon against the map background, the location of the second element icon corresponding to the location of the second network element with respect to the earth-based coordinate system.

23. The apparatus of claim 22 wherein the physical medium coupling the first network element and the second network element comprises a fiber optic cable, and wherein the network link comprises a segment within a Synchronous Optical Network system.

* * * * *